(12) United States Patent
Moreau

(10) Patent No.: US 9,261,394 B2
(45) Date of Patent: Feb. 16, 2016

(54) DOSING DEVICE AND METHOD FOR DOSING AND DISPENSING BY MEANS OF THE DOSING DEVICE

(71) Applicant: BAYER CROPSCIENCE AG, Monheim am Rhein (DE)

(72) Inventor: Fabrice Moreau, Tassin la Demi Lune (FR)

(73) Assignee: BAYER CROPSCIENCE AG, Monheim (DE)

( * ) Notice: Subject to any disclaimer, the term of this patent is extended or adjusted under 35 U.S.C. 154(b) by 0 days.

(21) Appl. No.: 14/394,534

(22) PCT Filed: Apr. 24, 2013

(86) PCT No.: PCT/EP2013/058463
§ 371 (c)(1),
(2) Date: Oct. 15, 2014

(87) PCT Pub. No.: WO2013/160337
PCT Pub. Date: Oct. 31, 2013

(65) Prior Publication Data
US 2015/0083753 A1    Mar. 26, 2015

(30) Foreign Application Priority Data
Apr. 26, 2012   (EP) ..................... 12165744

(51) Int. Cl.
*G01F 11/26*    (2006.01)

(52) U.S. Cl.
CPC ............ *G01F 11/262* (2013.01); *G01F 11/263* (2013.01)

(58) Field of Classification Search
CPC ...... G01F 11/26; G01F 11/262; G01F 11/263
USPC ............................................ 222/158, 454, 29
See application file for complete search history.

(56) References Cited

U.S. PATENT DOCUMENTS

| 2,485,194 | A | * | 10/1949 | Friedman | .............. | G01F 11/262 222/455 |
| 4,079,859 | A | | 3/1978 | Jennings | | |
| 4,860,927 | A | | 8/1989 | Grinde | | |
| 5,186,367 | A | | 2/1993 | Hickerson | | |

FOREIGN PATENT DOCUMENTS

| DE | 667247 C | 11/1938 | |
| EP | 2243721 A1 | 10/2010 | |
| FR | 2593143 A1 * | 7/1987 | ............ G01F 11/263 |

OTHER PUBLICATIONS

International Search Report received in corresponding PCT/EP2013/058463, mailed Aug. 21, 2013.

* cited by examiner

*Primary Examiner* — Nicholas J Weiss
(74) *Attorney, Agent, or Firm* — Miles & Stockbridge PC

(57) ABSTRACT

The invention relates to a dosing device comprising a storage container and a storage chamber disposed therein, a dosing container and a dosing chamber disposed therein, and a dosing connection between the storage chamber and the dosing chamber.

19 Claims, 2 Drawing Sheets

DOSING DEVICE AND METHOD FOR DOSING AND DISPENSING BY MEANS OF THE DOSING DEVICE

CROSS REFERENCE TO RELATED APPLICATIONS

Figure 1:
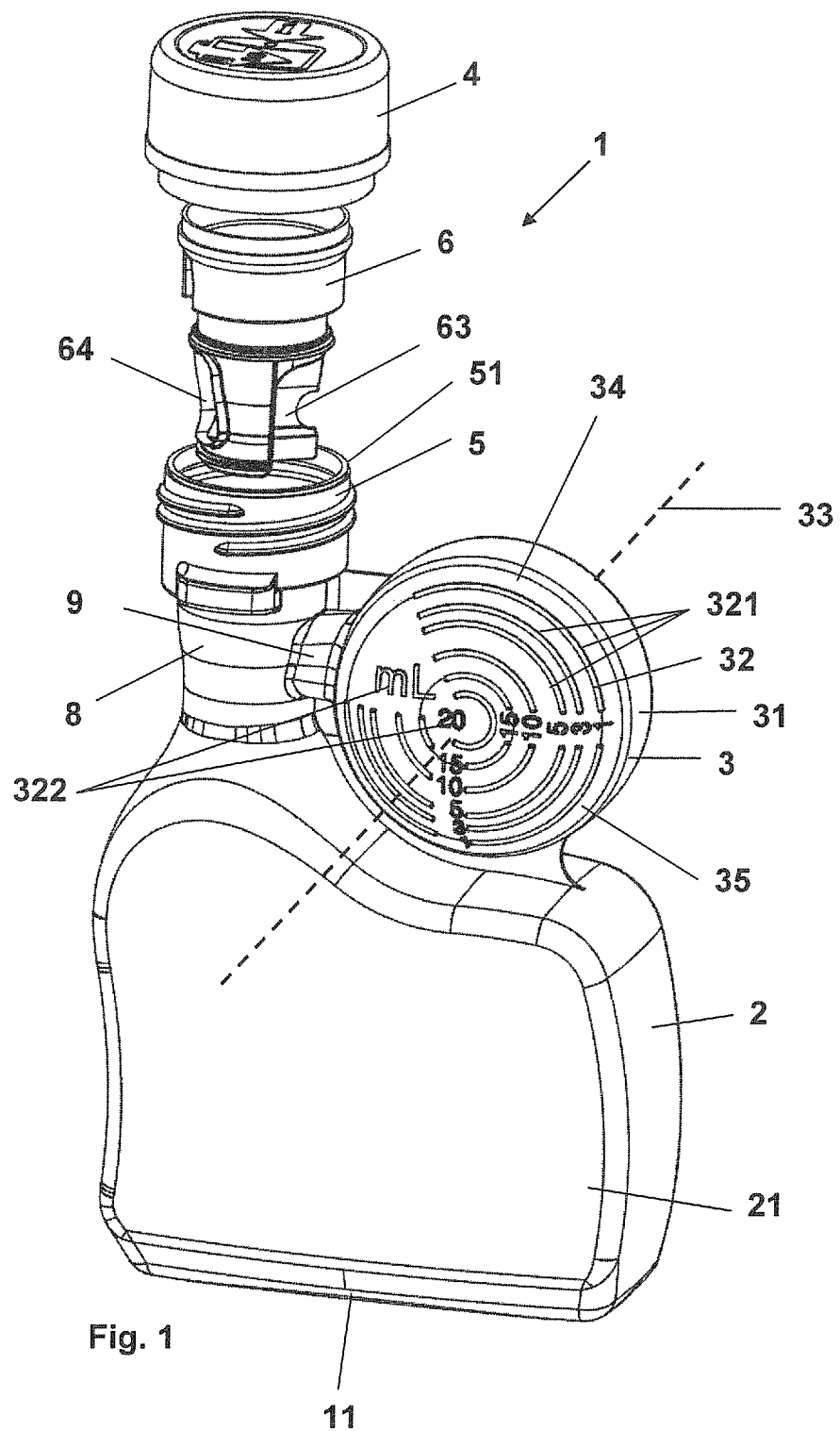

This application is a §371 National Stage Application of PCT/EP2013/058463, filed Apr. 24, 2013, which claims priority to EP 12165744.9, filed Apr. 26, 2012.

BACKGROUND

1. Field of the Invention
2. Description of Related Art

The invention relates to a dosing device comprising a storage container, a dosing container and a dosing connection between a dosing chamber in the dosing container and a storage chamber in the storage container. A filling material arrives from the storage chamber through the dosing connection in the dosing chamber when the dosing device is pivoted around a pivot axis. The dosing device is provided for dispensing a filling material from the storage chamber in a dosed manner. Furthermore, the invention relates to a method for dosing the filling material by means of the dosing device.

For the purpose of dosing, only a part of the filling material is usually transferred first from the storage chamber into the dosing chamber of the dosing container. This process is repeated until the quantity of the filling material desired by the user has been accommodated in the dosing chamber. In the process, an estimate of the quantity of filing material located in the dosing chamber is carried out by means of a filling material indicator attached to the dosing container. Then, this quantity of filling material is removed from the dosing chamber by being discharged to the outside through an outlet opening on an outlet of the dosing device.

Such a dosing device is known from EP 2 243 721 A1, in which filling level marks are provided on the dosing chamber in one embodiment that serve for measuring the filling material quantity in the dosing chamber.

Determining the filling level is difficult despite the filling level marks being provided, because the dosing device usually has to stand upright on a supporting surface for this purpose. However, filling the dosing chamber takes place by inclining the dosing chamber, with the dosing chamber being filled more in the case of great inclination than in the case of small inclination. In order to achieve an exact filling level, the dosing device must be placed upright again and again after having been inclined, in order to be able to read off the current filling level, and in order to be able to decide, dependent thereon, whether or not filling material should be continued to be filled into the dosing chamber.

SUMMARY

It is therefore the object of the invention to improve the dosing device in such a way that the estimate of the filling level of the filling material in the dosing chamber is simplified in particular while filling the dosing chamber. It is another object of the invention to develop a method according to which dosing by means of the dosing device can take place more easily and exactly.

The object to be achieved is achieved by the dosing device according to patent claim 1 as well as by the method according to patent claim 11. The dependent claims constitute exemplary embodiments of the invention.

DETAILED DESCRIPTION OF A PREFERRED EMBODIMENT

According to the invention, the dosing container comprises a filling level indicator with at least one curved marking line. A certain filling level of the filling material in the dosing chamber is indicated by the curved marking line at different pivot angles around the pivot axis.

The filling level indicator can be attached on its outside or its inside. Preferably, the filling level indicator can be attached to the dosing container by casting during the manufacture of the dosing device, but also by subsequent stamping or application of paint. Beyond this, any method is suitable for this purpose by means of which a visually perceivable filling level indicator on the dosing container can be obtained.

In this case, the dosing connection can comprise a connecting conduit disposed at one opening of the dosing container. However, the dosing chamber and the storage chamber can also be disposed immediately adjacent to one another, so that the dosing connection substantially consists of opposing openings in the storage chamber and in the dosing chamber. Other configurations of the dosing connection are also possible.

The filling material located in the storage chamber, which can preferably be provided in liquid, powdery or granulate form, is transferred from the storage chamber into the dosing chamber by the dosing device being inclined around the pivot axis. Any axis can be suitable as a pivot axis, so that the relative position in space of the storage chamber and the dosing chamber can be changed by pivoting around this axis, so that the filling material can come from the storage chamber through the dosing connection into the dosing chamber (or vice versa). If the shape of the dosing device is spatially symmetrical, for example mirror-symmetrical with regard to a plane that intersects the dosing device, then the pivot axis can be given by any axis perpendicular to this plane.

In particular, the curved marking line can lie in a plane that extends perpendicularly to the pivot axis. If the marking line does not lie within such a plane, then, according to the invention, its projection into a plane perpendicular to the pivot axis is curved.

The area of the different pivot angles at which the certain filling level is indicated by the marking line suitably extends over an angle range that is greater than 90 degrees, it can particularly be greater than 180 degrees.

According to one embodiment of the invention, the filling level indicator indicates the filling level of the filling material in the dosing chamber at a pivot angle of the dosing device around the pivot axis at which the filling material can be transferred from the storage chamber into the dosing chamber, in particular also in the case of a completely filled storage chamber and also in the case of an almost emptied storage chamber. This embodiment is advantageous in that the process of dosing, i.e. of filling the filling material from the storage chamber into the dosing chamber, can be simplified: The dosing device pivoted for the purpose of filling does not have to be returned first to another position in which an estimate or measurement of the filling level can take place. Rather, the filling level of the filling material in the dosing chamber can be read off directly while the dosing device is pivoted. The process of pivoting back and forth can thus be minimized or completely avoided, and the dosing process can be simplified accordingly.

If a given filling material quantity of the filling material is located in the dosing chamber, then an associated filling level approximately defines a plane at every pivot angle of the dosing device. Preferably, the marking line is configured in such a way that this plane is tangent to the marking line at different pivot angles, i.e., that the plane touches the curved marking line approximately in one point.

According to the invention, the dosing chamber has an axisymmetrical basic shape. For example, the basic shape can be substantially cylindrical, spherical or in the form of a spherical segment. According to the invention, the axis of symmetry of the basic shape is parallel to the pivot axis. Due to this design of the dosing chamber, a simplification of the filling level indicator can be achieved because the marking line of the filling level indicator can relate to the symmetry of the dosing chamber.

The marking line can be approximately configured in the form of one or more circle segments, with the several circle segments being partial segments of a circle. Also, the filling level indicator can comprise several marking lines. In that case, the marking lines can lie on concentric circles around a center which lies on the axis of symmetry of the dosing chamber. The marking lines can, but do not have to be, disposed at the same radial distance to one another.

Optionally, the marking line consists of a single line section, with the filling level being indicated for all pivot angles over which the line section extends. However, the marking line can also be interrupted, comprise several line sections and/or point marks and/or other suitable indicating symbols. A curved marking line is presumed even if individual markings that have the property that the markings show a certain filling level at different pivot angles can be connected by an imaginary curved line. Moreover, the filling level indicator can comprise several marking lines, with each of the marking lines indicating a different filling level.

One embodiment of the invention provides that the filling level indicator comprises an inscription. The inscription can be composed of combinations of numbers and letters, the inscription serving the purpose of establishing an association of the marking line to a filling quantity of the filling material in the dosing chamber. For example, the inscription can be a number with a measurement indication, such as volume or weight, disposed in the vicinity of the marking line, so that the filling level indicated by the marking line corresponds to a volume or weight correspondingly indicated by the inscription. In the case of several marking lines, each of the marking lines is suitably provided with a measurement indication associated with it.

Furthermore, the dosing device can comprise an outlet with an outlet opening, so that the discharge of the filling material takes place through the outlet and the outlet opening to the outside.

Moreover, the dosing device can also comprise a closure member. If the dosing device is provided with the outlet at the same time, then the closure member is provided for making the outlet opening of the outlet lockable. In particular, the closure member can be configured as a rotary closure member. The closure member can for instance also be configured as a removable closure cap. However, it is also possible to configure the closure member as a sliding closure member, a hinged closure member, or also in any other suitable form, and to provide it additionally with further functions, such as a child-proof lock.

According to another embodiment of the invention, the dosing device comprises a valve. The valve can assume a dosing position and a dispensing position. In the dosing position, the valve opens the dosing connection between the storage chamber and the dosing chamber and at the same time shuts an outlet passage from the dosing chamber to the outlet opening. In the dispensing position, the valve shuts the dosing connection and opens the outlet passage.

In one exemplary embodiment, a closure member with which the outlet opening can be closed off is non-rotatably coupled to the valve in such a way that by this coupling the closure member is locked with the outlet as long as the valve is in its dosing position. Thus, the outlet opening remains closed by the closure member for as long as the filling material is able to come from the storage chamber into the dosing chamber via the dosing connection. An additional safeguard against an inadvertent discharge of the filling material can be accomplished by means of such a coupling. The closure member can be omitted if the valve is returned from the dispensing position into the dosing position after the filling material has been dispensed. In that case, it is impossible for the filling material to escape from the dosing device.

Furthermore, it is possible to arrange the valve so as to be rotatable in the cylinder-like valve seat. For example, the valve can be rotated between its dosing position and dispensing position.

Moreover, the closure member is suitably configured as a rotary closure member. A coupling can be provided between the closure member and the valve. For example, the coupling may be such that the closure member can be non-rotatably connected to the valve. By this it can be achieved that the valve is co-displaceable during rotation of the closure member. Thus, a user of the dosing device is able to bring the valve into the dosing position or dispensing position by rotating the closure member, which is usually disposed so as to be easily accessible for him.

According to one embodiment of the invention, the storage container and the dosing container are configured as a single piece, which can entail the advantage of a simple design. The outlet and/or the valve seat can also be formed as one piece with the storage container and/or the dosing container. It is also possible to form all parts of the dosing device as one piece, with the exception of the closure member and/or the valve. The materials suitable for producing the dosing device are primarily plastics. Particularly suitably, at least the storage container and the dosing container are made from a transparent or semi-transparent material.

The method according to the invention is carried out by means of the dosing device, and it comprises the following steps: a part of the filling material is filled into the dosing chamber by pivoting the dosing device around the pivot axis, wherein the dosing chamber has an axisymmetrical basic shape and the axis of symmetry of the basic shape of the dosing chamber is parallel to the pivot axis; the filling material in the pivoted dosing chamber is measured, wherein the measurement takes place using the filling level indicator disposed on the dosing container, and wherein the marking line of the filling level indicator is tangent to the filling material level at a certain quantity of the filling material in the dosing chamber and at different pivot angles around the pivot axis; the measured filling material in the dosing chamber is dispensed from the dosing device, wherein dispensing is carried out by pivoting the dosing device around the pivot axis or an axis parallel thereto, so that the filling material comes from the dosing chamber to the outlet and thence to the outside.

In this context, the person skilled in the art is well aware that pivoting once is not always sufficient for filling the filling material from the storage chamber into the dosing chamber. Rather, small corrections of the pivot angle may be required. However, the design according to the invention of the marking line offers the advantage that the filling quantity of the filling material in the dosing chamber can still be indicated even if the pivot angle is changed.

Due to the arrangement of the storage chamber and the dosing chamber, one embodiment of the method is such that the pivoting of the dosing device when the filling material is filled from the storage chamber into the dosing chamber takes place in the opposite direction to the pivoting of the dosing device when the filling material is dispensed. Another embodiment provides that pivoting is carried out in a single pivoting direction in both methods steps.

Another embodiment of the method further comprises a first displacement of the valve of the dosing device, whereby the valve is brought into the dosing position, and a second displacement of the valve, whereby the valve is brought into the dispensing position. The first displacement can take place, for example, by rotating the valve, whereas the second displacement can take place, for example, by a corresponding rotation in the direction opposite to the first rotation.

Moreover, the first and second displacement can be accomplished by a rotation of the closure member, with the closure member being rotatably disposed on the outlet and non-rotatably coupled to the valve.

Moreover, the storage container and the dosing container can be connected to one another as an inseparable unit, so that pivoting one of the two parts at the same time causes the other part to be pivoted correspondingly. Thus, in particular the relative position in space of the storage container and the dosing container changes during pivoting.

Figure 2A:
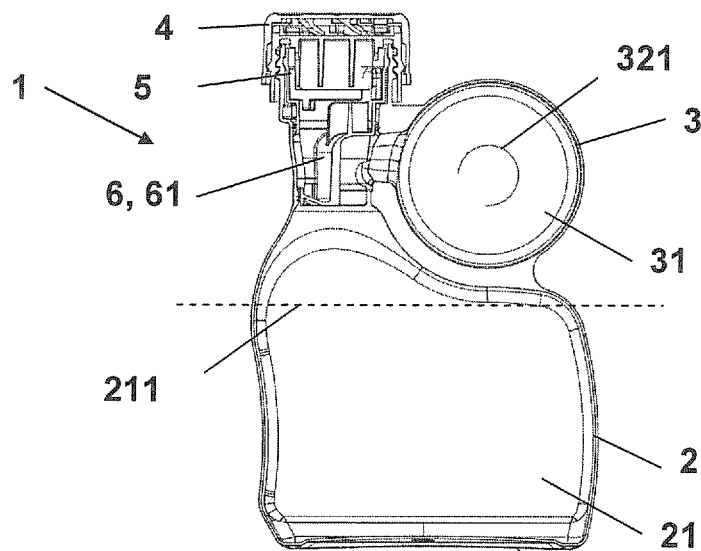
Figure 2B:
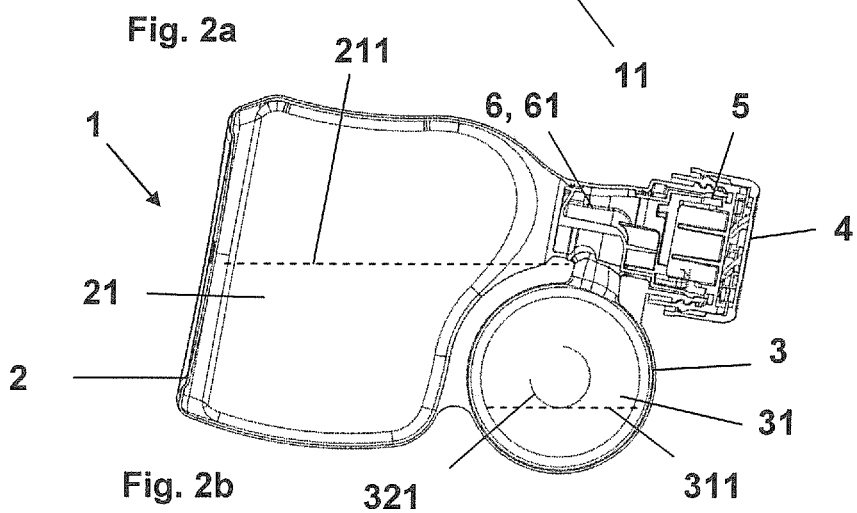
Figure 2C:
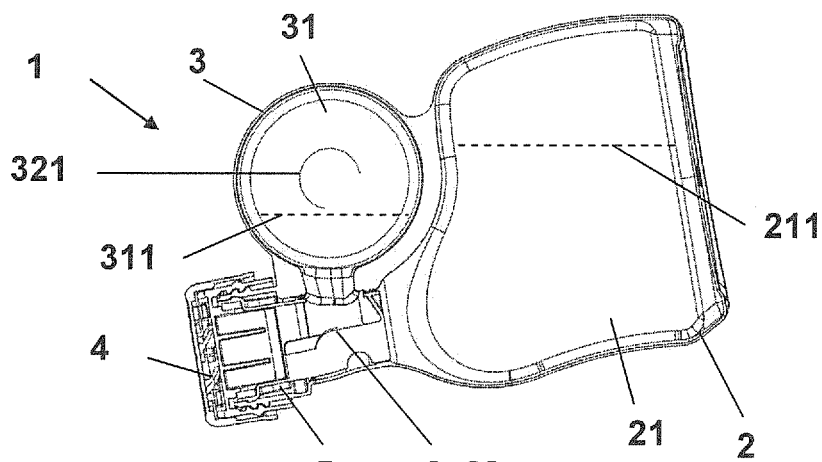

The invention is explained in more detail below with reference to the FIGS. 1 2a-c, in which FIG. 1 shows an exploded view of the dosing device according to the invention;

FIGS. 2a-c each show a cross-sectional view of the dosing device of FIG. 1.

FIG. 1 shows an embodiment of the dosing device 1 according to the invention. The dosing device 1 comprises a storage container 2 with a storage chamber 21 whose sweeping shape opens out into a valve seat 8. A dosing container 3 with a dosing chamber 31 is disposed laterally of the valve seat 8. Thus, the dosing container 3 and the valve seat 8 are situated at approximately the same vertical height relative to a supporting surface 11 of the dosing device 1. A connecting conduit 9 extending between the dosing container 3 and the valve seat 8 extends substantially horizontally.

The dosing container 3 comprises a cylindrical basic shape with rounded-off corner areas 34, with a cylinder axis 33 of the dosing container 3, which is also its axis of symmetry, extending in the horizontal direction, provided the dosing device 1 is placed on a non-inclined surface. The axial extension of the dosing container 3 is smaller than the extension in the radial direction. In other words: In this exemplary embodiment, the height of the substantially cylindrical dosing container is smaller than its diameter, in this case approximately half as small.

With its cylindrical shape, the dosing chamber 31 is configured symmetrically, so that marking lines 321 are provided on the dosing container 3 that are configured in the form of concentric partial circle sections on both end faces 35 (only one of which can be seen in the Figures). In this way, the filling level of a part of the filling material located in the dosing chamber can be shown for a plurality of inclination angles around the cylinder axis 33 or a pivot axis parallel, i.e. for an angle range of about 270 degrees. One of the marking lines 321 in this case indicates the same filling level for all inclination angles. Moreover, a measurement indication 322 in ml that denotes the filling level indicated by the marking line 321 is assigned to each of the marking lines 321.

Beginning at the starting position of the dosing device 1, in which the cylinder axis 33 extends horizontally, a part of the filling material can be transferred from the storage chamber into the dosing chamber or vice versa by inclining the dosing device 1 around a pivot axis parallel to the cylinder axis 33. The filling material can also be dispensed from the dosing chamber via the outlet opening 51 to the outside by inclining the dosing device 1 around a parallel pivot axis.

At the same time, the illustration of the dosing device in FIG. 1 makes clear that pivot axes parallel to the cylinder axis 33 are, of course, not the only pivot axes around which the dosing device can be inclined for dosing out/dispensing the filling material. However, in order to be able to read off the filling level of the filling material in the dosing chamber 31 correctly by means of the marking lines 321, the dosing device needs preferably to be oriented in such a way that the pivot axis and the cylinder axis 33 run parallel.

A closure member 4 is configured as a rotary closure member closing off an outlet 5. A valve seat 8 forms a rotatable support for the valve 6. Furthermore, in a preferred embodiment, the closure member 4 is provided with a child-proof lock. For this purpose the closure member is formed of two parts. An inner part of the closure member is rotatably and movably mounted on an outer part of the closure member 4. If the closure member 4 is located on the outlet 5 when the dosing device 1 is in the upright position (the position shown, in particular, in the FIG. 2a), then, however, protrusions or recesses disposed on the outer part and pointing towards the inner part can be caused, by pressing down the outer part of the closure member 5 against the spring force of a spring member disposed on the outer part, to latch into recesses or protrusions that correspond to them, are disposed on the inner part and point towards the outer part, and to establish a positive fit with them in the circumferential direction, so that a rotation of the outer part of the closure member 4 causes a rotation of the entire closure member 4. Accordingly, two manipulations are required for opening the dosing device 1 (pressing down while at the same time rotating the closure member 4), which makes access to the contents of the dosing device more difficult for an infant.

Furthermore, the outlet 5 has a cylindrical basic shape. An upper end face of the outlet 5 constitutes an outlet opening 51. The filling material is dispensed from the dosing chamber 31 to the outside via the outlet opening 51.

The valve seat 8 of the dosing device 1 is configured to accommodate the valve 6. The valve 6 is rotatably mounted in the valve seat 8.

The valve 6 has a substantially cylindrical basic shape with two at least partially open end faces in form of discs, the first of which faces upwards and the other downwards in the illustration of FIG. 1. Moreover, the cylindrical valve 6 comprises a side surface connecting the two end faces in which a first opening 63 and a second opening 64 are provided. In a dosing position 61 of the valve 6 the first opening 63 points to the dosing chamber so that a dosing connection between the storage chamber 21 and the dosing chamber 31 via the connecting conduit 9, the first opening 63 and the partially open lower end face of the valve 6 is open. In the dispensing position 62 of the valve 6 the second opening 64 points to the dosing chamber 21 so that an outlet passage from the dosing chamber 31 to the outlet opening 51 extending through the connecting conduit 9, the second opening 64 and the upper end face of the valve 6 is open. In the dosing position 61, filling material can be filled from the storage chamber 21 into the dosing chamber 31, whereas in the dispensing position 62, the filling material can be dispensed from the dosing chamber 31 through the outlet opening 51.

FIGS. 2a, 2b and 2c show a cross-sectional view of the dosing device 1 at different pivot angles. Components or features that are completely or partially identical to components or features in FIG. 1 are provided with the same reference numerals. In particular, the FIG. 2a-c are supposed to illustrate the process of dosing the filling material by means of the dosing device.

FIG. 2a shows the dosing device 1 in an upright position in which the supporting surface 11 points downwards. The filling level of the filling material in the storage chamber 21 is indicated by the interrupted line 211. In this illustration, the dosing chamber 31 is empty. The valve 6 is in its dosing position 61. The dosing container is provided with the marking line 321 configured in the form of a circle. In this and the following FIGS. 2b and 2c, the axis of symmetry of the dosing chamber 31 stands perpendicularly on the plane of the drawing.

FIG. 2b shows the dosing device 1 during the dosing process. In FIG. 2b, the dosing device 1 is pivoted by a pivot axis parallel to the axis of symmetry of the dosing chamber 31. Because the valve 6 is in its dosing position 61, the filling material, at the pivot angle shown, arrives in the dosing chamber 31 from the storage chamber 21. The filling material can filled until the filling material level in the storage chamber 21 drops to a level which is just below the opening of the end face of the valve 6 that in this illustration is on the left. This filling material level is indicated in FIG. 2b by the interrupted line 211. At the same time, the dosing chamber 31 is partially filled with the filling material. The filling material level of the filling material in the dosing chamber 31 is indicated by the interrupted line 311.

It should be noted in this case that the FIGS. 2a-c are only supposed to serve for qualitative illustration, and that therefore, the filling levels indicated by the lines 211 and 311 in the FIGS. 2a-c are unsuitable for being compared with each other or evaluated quantitatively.

The plane (which in the illustration of FIGS. 2a-c always stands perpendicularly on the plane of the drawing) defined by the filling material level 311 of the filling material in the dosing chamber 31 is tangent to the marking line 321. Thus, the filling level of the filling material in the dosing chamber 31 can be read off while the dosing device 1 is pivoted. As can be seen in FIG. 2b, this applies to other pivot angle position of the dosing device 1, specifically to all pivot angles of an angle range which is limited only by pivot angles at which the filling material escapes from the dosing chamber 31.

FIG. 2c shows the dosing device 1 when the filling material is dispensed from the dosing chamber 31. In this case, the dosing device 1, compared to the upright position shown in FIG. 2a, is pivoted the approximately same pivot angle as the dosing device 1 shown in FIG. 2b, but in the opposite direction. The filling level in the dosing chamber 31 indicated by the line 311 in this case is lower than the one in FIG. 2b because in this pivoting position, a part of the filling material arrives in the empty spaces within the connecting conduit 9, the valve 6 and the outlet 5.

In FIG. 2c, the valve 6 is in its dispensing position 62, so that, if the closure member 4 is removed from the outlet 5, the filling material can arrive at the outlet opening 51 from the dosing chamber 31 via the connecting conduit 9 and the second opening 64 and the opening in the end face of the valve 6 which is on the left in FIG. 2c, in order to thus escape from the dosing device 1. At the same time, the valve 6 shuts off the outlet passage so that the filling material cannot arrive at the outlet 5 from the storage chamber.

LIST OF REFERENCE SYMBOLS

1 Dosing device
11 Supporting surface
2 Storage container
21 Storage chamber
211 Filing level line
3 Dosing container
31 Dosing chamber
311 Filing level line
32 Filling level indicator
321 Marking line
322 Measurement indication
33 Cylinder axis
34 Rounded area
35 End face
4 Closure member
5 Outlet
51 Outlet opening
6 Valve
61 Valve in the dosing position
62 Valve in the dispensing position
63 Opening
64 Opening
8 Valve seat
9 Connecting conduit

The invention claimed is:

1. Dosing device, comprising a storage container with a storage chamber and a dosing container with a dosing chamber, a dosing connection between the dosing chamber and the storage chamber through which filling material comes from the storage chamber into the dosing chamber when the dosing device is pivoted around a pivot axis, wherein the dosing container comprises a filling level indicator with at least one curved marking line which indicates a certain filling level of the filling material in the dosing chamber at different pivot angles, wherein the dosing chamber has an axisymmetrical shape and the axis of symmetry of the shape of the dosing chamber is parallel to the pivot axis, wherein the at least one curved marking line is configured in the form of circle segments, and wherein a center of the circle segments lies on the axis of symmetry.

2. Dosing device according to claim 1, wherein a filling material level of the filling material of a predetermined filling quantity located in the dosing chamber is tangent to the at least one curved marking line at different pivot angles.

3. Dosing device according to claim 1, wherein the at least one curved marking line comprises a single line section.

4. Dosing device according to claim 1, wherein the filling level indicator comprises an inscription with an association of the at least one curved marking line and filling quantity.

5. Dosing device according to claim 1, wherein the dosing device comprises an outlet with an outlet opening for dispensing the filling material.

6. Dosing device according to claim 5, wherein the dosing device comprises a closure member with which the outlet can be closed.

7. Dosing device according to claim 5, wherein the dosing device comprises a valve, and the valve can assume a dosing position and a dispensing position wherein the valve, in the dosing position, opens the dosing connection between the dosing chamber and the storage chamber and shuts an outlet passage from the dosing chamber to the outlet opening and the valve, in the dispensing position, shuts the dosing connection and opens the outlet passage.

8. Dosing device according to claim 6, wherein the closure member is non-rotatably coupled to the valve.

9. Dosing device according to claim 1, wherein the storage container and the dosing container are formed as one piece.

10. Method for dosing and dispensing a filling material by a dosing device comprising a storage container with a storage chamber, a dosing container with a dosing chamber, a dosing connection between the storage chamber and the dosing chamber and an outlet, comprising:

filling a part of the filling material from the storage chamber into the dosing chamber by pivoting the dosing device around a pivot axis, wherein the dosing chamber has an axisymmetrical shape and the axis of symmetry of the shape of the dosing chamber is parallel to the pivot axis;

measuring the filling material in the dosing chamber of the pivoted dosing device by a filling level indicator which is disposed on the dosing container and comprises at least one curved marking line which is tangent to the filling material level at a predetermined filling material quantity and at different pivot angles of the dosing device around the pivot axis, wherein the at least one curved marking line is configured in the form of circle segments, and wherein a center of the circle segments lies on an axis of symmetry;

dispensing the filling material by pivoting the dosing device around the pivot axis, wherein the filling material comes from the dosing chamber through the outlet to the outside.

11. Method according to claim 10, wherein the method further comprises:

a first displacement of a valve of the dosing device, wherein the valve is brought into a dosing position by the first displacement, wherein the valve, in the dosing position opens the dosing connection between the dosing chamber and the storage chamber and shuts an outlet passage from the dosing chamber to the outlet;

a second displacement of the valve, wherein the valve is brought into a dispensing position by the second displacement, and the valve, in the dispensing position shuts the dosing connection and opens the outlet passage.

12. Method according to claim 11, wherein the first and second displacement of the valve is carried out by rotating a rotatable closure member which is disposed on the outlet and non-rotatably coupled to the valve.

13. Method according to claim 10, wherein, due to configuration of the dosing container and the storage container as an inseparable unit, the storage chamber and the dosing chamber are pivoted at the same time by pivoting the dosing device.

14. The device of claim 1, wherein the at least one curved marking line extends over an angle range that is greater than 90 degrees.

15. The method of claim 10, wherein the at least one curved marking line extends over an angle range that is greater than 90 degrees.

16. The device of claim 1, wherein the axisymmetrical shape is cylindrical or spherical.

17. The method of claim 10, wherein the axisymmetrical shape is cylindrical or spherical.

18. The device of claim 1, wherein the filling level indicator comprises more than one curved marking line configured in the form of circle segments, wherein the circle segments are disposed concentrically, and wherein a center of the circle segments lies on the axis of symmetry.

19. The method of claim 10, wherein the filling level indicator comprises more than one curved marking line configured in the form of circle segments, wherein the circle segments are disposed concentrically, and wherein a center of the circle segments lies on the axis of symmetry.

* * * * *